United States Patent
Honobe

(10) Patent No.: US 7,983,524 B2
(45) Date of Patent: Jul. 19, 2011

(54) INTERACTIVE COMMUNICATION APPARATUS AND STATUS SIGNALING METHOD

(75) Inventor: Teruhiro Honobe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1287 days.

(21) Appl. No.: 11/426,456

(22) Filed: Jun. 26, 2006

(65) Prior Publication Data

US 2007/0003254 A1  Jan. 4, 2007

(30) Foreign Application Priority Data

Jun. 30, 2005 (JP) .................... 2005-192732

(51) Int. Cl.
*H04N 5/917* (2006.01)

(52) U.S. Cl. ..................... 386/228; 386/231

(58) Field of Classification Search ............ 386/46, 386/95, 107, 117, 125, 200, 228, 231
See application file for complete search history.

(56) References Cited

U.S. PATENT DOCUMENTS

| | | | | | |
|---|---|---|---|---|---|
| 4,890,168 | A | * | 12/1989 | Inoue et al. | 386/69 |
| 5,706,388 | A | * | 1/1998 | Isaka | 386/125 |
| 5,995,705 | A | * | 11/1999 | Lang | 386/46 |
| 7,409,701 | B1 | * | 8/2008 | Tiphane | 725/105 |
| 7,548,255 | B2 | * | 6/2009 | Bear et al. | 348/207.11 |
| 2009/0086010 | A1 | * | 4/2009 | Tiphane | 348/14.01 |

FOREIGN PATENT DOCUMENTS

| | | |
|---|---|---|
| JP | 1-236789 | 9/1989 |
| JP | 6-121305 | 4/1994 |
| JP | 8-32945 | 2/1996 |
| JP | 2000-78547 | 3/2000 |
| JP | 2001-333397 | 11/2001 |
| JP | 2004-23628 | 1/2004 |
| JP | 2004-101708 | 4/2004 |

* cited by examiner

*Primary Examiner* — Huy T Nguyen

(74) *Attorney, Agent, or Firm* — Oblon, Spivak, McClelland, Maier & Neustadt, L.L.P.

(57) ABSTRACT

An interactive communication apparatus is disclosed which has a video signal obtained by an image pickup device performing an image pickup activity and which has the obtained video signal sent to another apparatus through a communication section while causing a display section to display an image based on a video signal received from the other apparatus through the communication section. The apparatus includes: a pickup start and stop section; an indicator image storage section; a video switching section; and a control unit.

8 Claims, 6 Drawing Sheets

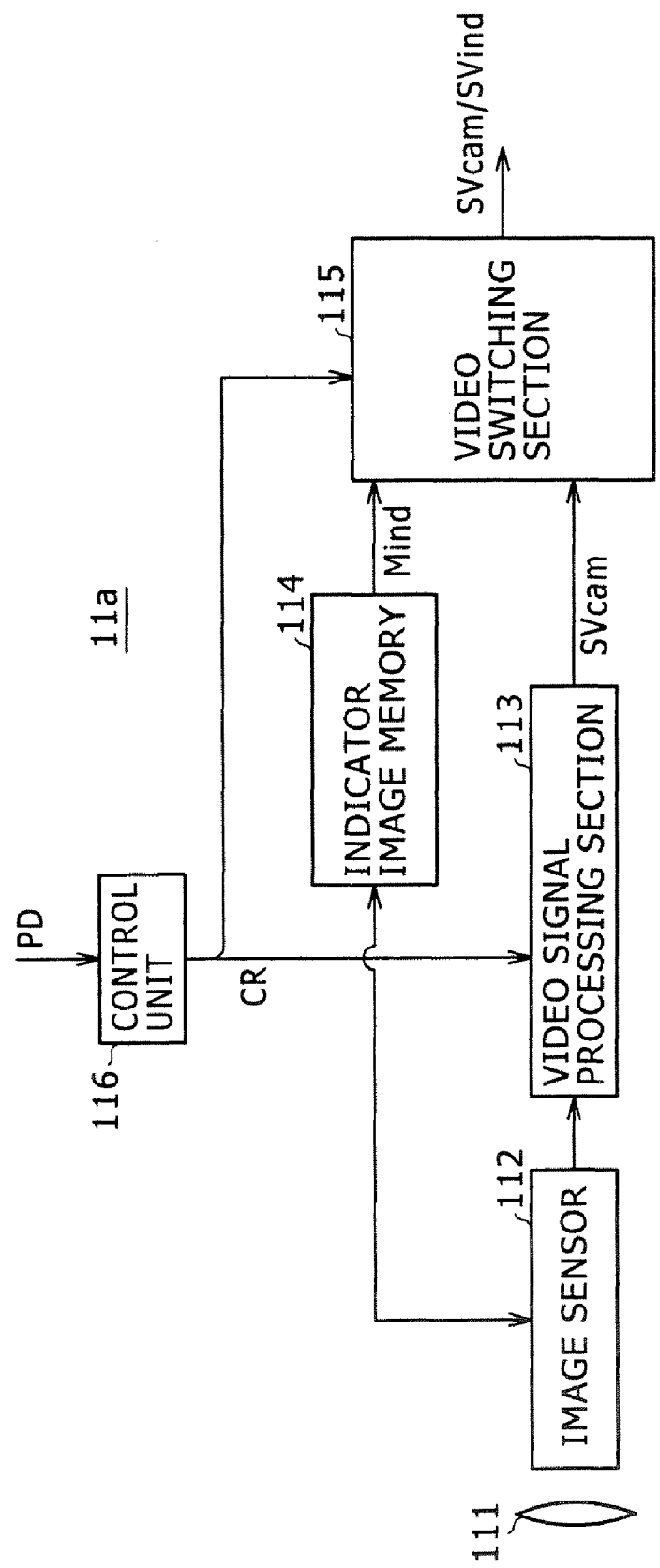

INTERACTIVE COMMUNICATION APPARATUS AND STATUS SIGNALING METHOD

CROSS REFERENCES TO RELATED APPLICATIONS

The present invention contains subject matter related to Japanese Patent Application JP 2005-192732 filed with the Japanese Patent Office on Jun. 30, 2005, the entire contents of which being incorporated herein by reference.

BACKGROUND OF THE INVENTION

1. Field of the Invention

The present invention relates to an interactive communication apparatus and a status signaling method for use in videoconferences and like situations. More particularly, the invention relates to an interactive communication apparatus as part of an interactive communication setup in which the apparatus, upon stopping its image pickup activity to keep any picked-up image from reaching a second apparatus in interactive communication with the first apparatus, sends to the second apparatus a video signal representative of an indicator image indicating that the first apparatus has stopped taking pictures.

2. Description of the Related Art

Recent years have witnessed widespread acceptance of videoconferencing systems whereby images are picked up at remote locations and sent to one another over a network for separate displays permitting interactive communication between the locations. Illustratively, one party may have his or her image picked up and sent to another party for display-based interactive communication.

A typical videoconferencing system (e.g., see Japanese Patent Laid-Open No. 2001-331429) utilizes a graphic user interface that displays, before the start of a videoconference, icons showing personal information about one party (in a first conference room) and the other party (in a second conference room), as well as icons showing the equipment set up in the first and the second conference rooms. Once connection is established, each party has his or her image picked up, sent to and displayed on the other party's screen.

SUMMARY OF THE INVENTION

In such cases of interactive communication, there is a need for any one of the parties involved to keep the party's image from appearing on the other party's screen while interactive communication is under way. However, if such an image-removing feature is installed and if the party's picked-up image is simply suppressed unannounced, the other party may interpret the absence of the image as indicative of a defective network or a faulty interactive communication apparatus and may well proceed wastefully to check for the possible failure.

The present invention has been made in view of the above circumstances and provides an interactive communication apparatus and a status signaling method for allowing one of two communicating parties who has stopped having his or her image picked up, to notify the other party that the image pickup activity has been stopped intentionally through the use of a simple structure.

In carrying out the present invention and according to one embodiment thereof, there is provided an interactive communication apparatus for having a video signal obtained by an image pickup device performing an image pickup activity and for having the obtained video signal sent to another apparatus through a communication section while causing a display section to display an image based on a video signal received from the other apparatus through the communication section, the interactive communication apparatus including: a pickup start and stop section (e.g., shutter) configured to stop the image pickup activity; an indicator image storage section configured to store image information constituting an indicator image indicating that the image pickup activity is stopped; a video switching section configured selectively to switch between the video signal obtained by the image pickup device performing the image pickup activity on the one hand, and a video signal based on the image information stored in the indicator image storage section on the other hand, the video switching section further supplying the communication section with the selected video signal; and a control unit configured to cause the video switching section to supply the communication section with the video signal based on the image information stored in the indicator image storage section when the image pickup activity is stopped by the pickup start and stop section. The image pickup device may preferably be configured to output the video signal based on the image information constituting the indicator image when the image pickup activity is stopped by the pickup start and stop section (shutter). Preferably, the interactive communication apparatus may further include a display processing section configured to cause the display section to display an image based on the video signal received from the other apparatus along with an image output by the video switching section.

According to another embodiment of the present invention, there is provided a status signaling method for use with an interactive communication apparatus which has a video signal obtained by an image pickup device performing an image pickup activity and which has the obtained video signal sent to another apparatus through a communication section while causing a display section to display an image based on a video signal received from the other apparatus through the communication section, the status signaling method causing a control unit for controlling transmission of the video signals to carry out a procedure including the steps of: determining whether the image pickup activity is stopped; and sending a video signal based on image information constituting an indicator image indicating that the image pickup activity is stopped, in place of the video signal obtained by the image pickup device performing the image pickup activity, if the image pickup active is found stopped in the determining step.

As outlined above, when the interactive communication apparatus of the present invention stops its image pickup activity, the apparatus sends to the other connected apparatus a video signal constituting an indicator image indicating that the image pickup activity is stopped intentionally. The indicator image appearing on the screen of the other apparatus shows that the image pickup activity has been stopped deliberately. This allows the other party to refrain from proceeding wastefully to check for a possible defect on the network or in the interactive communication apparatus resulting in the failed display.

BRIEF DESCRIPTION OF THE DRAWINGS

FIG. 6 is a block diagram showing an overall structure of an image pickup device.

DETAILED DESCRIPTION OF THE PREFERRED EMBODIMENTS

Figure 1:
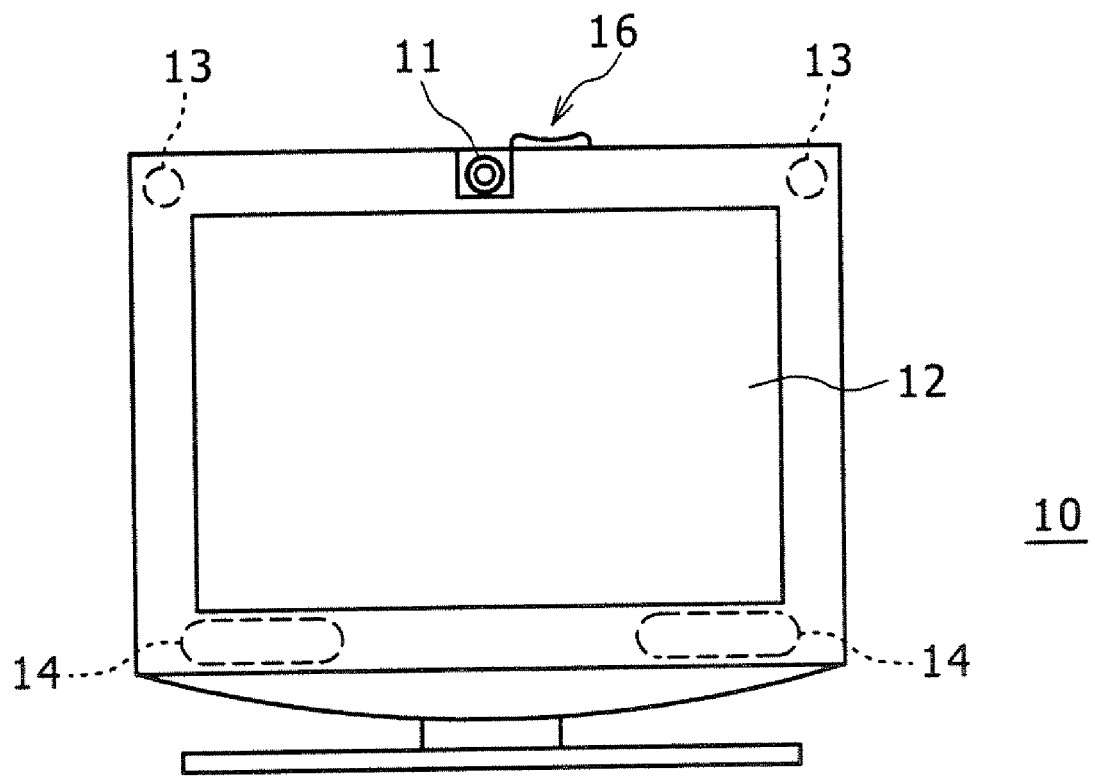
FIG. 1 is an external view of an interactive communication apparatus.

Preferred embodiments of the present invention will now be described with reference to the accompanying drawings. FIG. 1 is a front view of an interactive communication apparatus 10 for use illustratively in a videoconferencing system.

The interactive communication apparatus 10 includes integrally an image pickup device 11, a display 12, microphones 13, speakers 14, and a pickup start and stop section 16 for stopping the image pickup activity of the image pickup device 11. The enclosure of the apparatus 10 contains codecs and a communication section, not shown.

Figure 2:
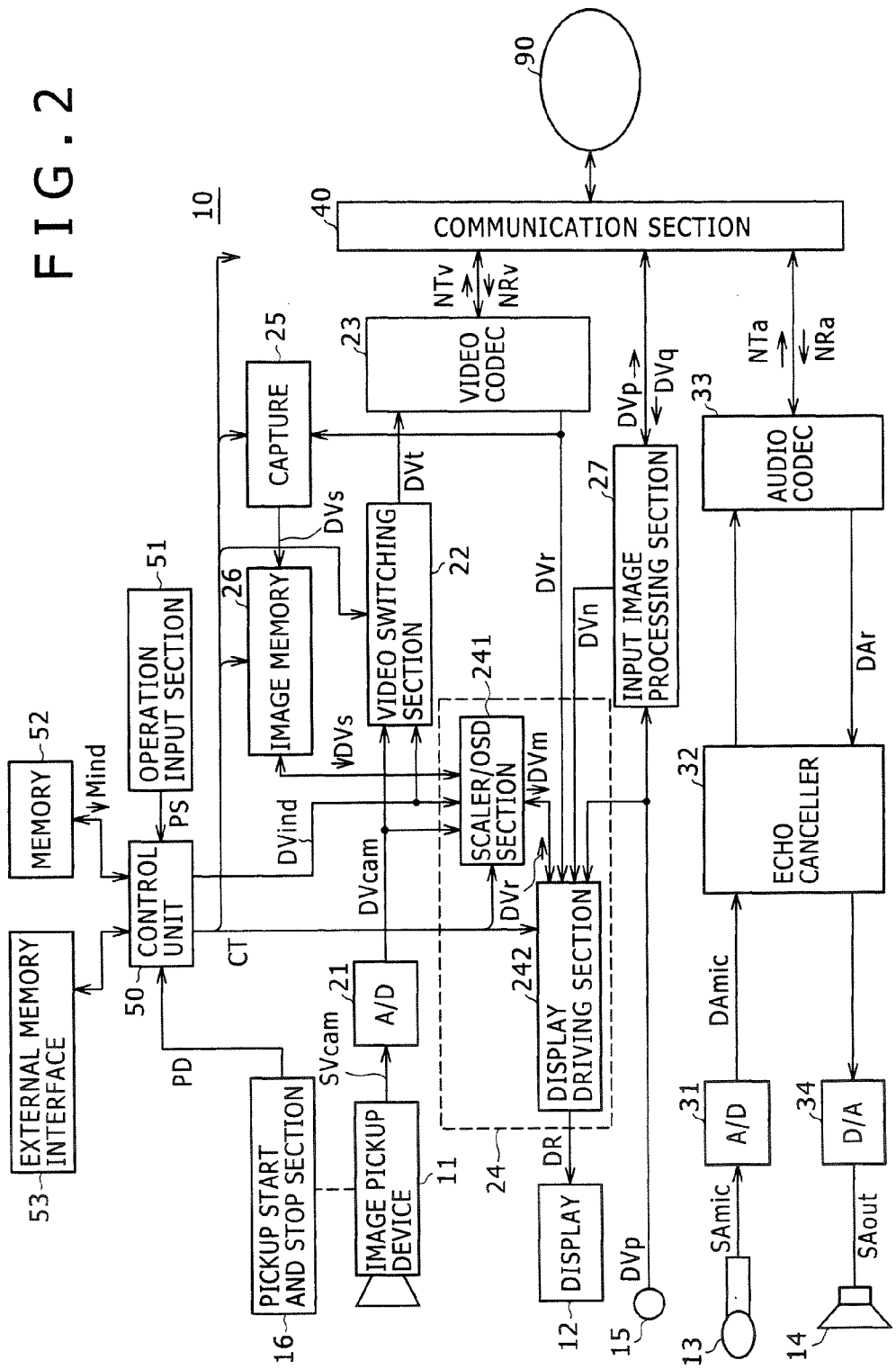
FIG. 2 is a block diagram showing a structure of the interactive communication apparatus.

FIG. 2 is a block diagram showing a structure of the interactive communication apparatus 10. In this structure, the image pickup device 11 is constituted by a CMOS image sensor, a CCD image sensor or the like. The image pickup device 11 generates a video signal SVcam representative of a picked-up image and supplies the generated signal to an A/D converter 21. The A/D converter 21 converts the video signal SVcam into a digital video signal DVcam, and forwards the converted signal to a video switching section 22 as well as to a scaler/OSD (on-screen display) section 241 in a displaying processing section 24.

In accordance with a control signal CT coming from a control unit 50, the video switching section 22 selects either the video signal DVcam supplied from the A/D converter 21 or a video signal DVind (to be described later) fed from the control unit 50. The selected signal is sent from the video switching section 22 to a video codec 23 as a video signal DVt.

The video codec 23 encodes (i.e., compresses) the video signal DVt to generate an encoded transmitter video signal NTv and supplies the generated signal NTv to a communication section 40. The video codec 23 further decodes (decompresses) an encoded receiver video signal NRv coming from the communication section 40 to acquire a video signal DVr and feeds the acquired signal DVr to a capture 25 and a display driving section 242 in the display processing section 24.

In keeping with the control signal CT (to be described later) coming from the control unit 50, the scaler/OSD section 241 scales up or down images based on the video signal DVcam, still pictures (to be discussed later) held in an image memory 26, and images based on the video signal DVr, and generates images based on text and color information. Also in accordance with the control signal CT from the control signal 50, the scaler/OSD section 241 generates a top screen, an address book screen, various menu screens, and a communication screen on which the other party is displayed while utilizing the generated images, images based on the video signals DVcam and DVr, still images, and scaled images as needed. Furthermore, the scaler/OSD section 241 supplies the display driving section 242 with a video signal DVm illustratively representing generated menu screens.

A capture 25 captures the video signal DVr from the video codec 23 to generate a still image signal DVs and feeds the generated signal DVs to the image memory 26. The image memory 26 has a capacity large enough to accommodate numerous still image signals including the still image signal DVs supplied from the capture 25. The image memory 26 also sends the still image signal DVs kept inside to the scaler/OSD section 241.

An input terminal 25 is designed to input images generated by a computer or like equipment (not shown). A video signal DVp input through the input terminal 15 from the computer or the like is forwarded to an input image processing section 27 and to the display driving section 242.

The input image processing section 27 is connected to the communication section 40. The video signal DVp sent through the input terminal 15 to the input image processing section 27 is forwarded to the communication section 40. The input image processing section 27 generates a new video signal DVn based on the video signal DVp coming from the input terminal 15 and on a video signal DVq from the communication section 40, and supplies the generated signal DVn to the display driving section 242.

In accordance with the control signal CT from the control unit 50, the display driving section 242 selects at least one of the video signal DVr from the video codec 23, video signal DVm from the scaler/OSD section 241, video signal DVp from the input terminal 15, and video signal DVn from the input image processing section 27. The display driving section 242 proceeds to generate a driving signal DR based on the selected video signal or signals and supply the generated signal DR to the display 12. The display 12 is constituted illustratively by a liquid crystal display, a plasma display panel or a cathode ray tube. Given the driving signal DR, the display 12 performs display driving operations accordingly to display images under instructions from the control unit 50.

The microphones 13 generate an audio signal SAmic and supply it to an A/D converter 31. The A/D converter 31 converts the audio signal SAmic into a digital audio signal DAmic and forwards the digital signal DAmic to an audio codec 33 through an echo canceller 32. The audio codec 33 encodes (i.e., compresses) the supplied audio signal DAmic to generate an encoded transmitter audio signal NTa and supplies the generated signal NTa to the communication section 40. The audio codec 33 further decodes (i.e., decompresses) an encoded receiver audio signal NRa coming from the communication section 40 to acquire an audio signal DAr and forwards the acquired signal DAr to a D/A converter 34 through the echo canceller 32. The D/A converter 34 converts the supplied audio signal DAr into an analog audio signal SAout and sends the analog signal SAout to the speakers 14. The speakers 14 provide audio output based on the audio signal SAout.

The communication section 40 is connected to a network 90. Over the network 90, the communication section 40 sends the encoded transmitter video signal NTv from the video codec 23, the encoded transmitter audio signal NTa from the audio codec 33 and the video signal DVp from the input image processing section 27 to the desired party's interactive communication apparatus. The communication section 40 also feeds a self-destined encoded receiver video signal NRv to the video codec 23 and a self-destined encoded receiver audio signal NRa to the audio codec 33. Furthermore, the communication section 40 supplies the received video signal DVq to the input signal processing section 27.

The control unit 50 is connected with the pickup start and stop section 16, an operation input section 51, a memory 52, and an external memory interface 53. The pickup start and stop section 16 is designed to select one of two states, i.e., whether or not to stop the image pickup activity depending on the user's operation. The pickup start and stop section 16 generates a pickup detection signal PD indicating either the continued activation or the interruption of image pickup and sends the generated signal PD to the control unit 50. Illustratively, the pickup start and stop section 16 is constituted by a shutter (i.e., lens cover) for covering a pickup lens of the image pickup device 11 and by a shutter switch that operates in interlocked relation with the shutter. The user may operate the shutter switch to expose or cover the pickup lens. In such a case, the shutter switch generates the pickup detection signal PD indicating whether the pickup lens is exposed or covered, and supplies the generated signal PD to the control unit 50.

The operation input section 51 generates an operation signal PS reflecting the user's operation. The operation input section 51 is illustratively made up of a keyboard, a pointing device (e.g., mouse), and/or a touch panel. The memory 52 is composed or a rewritable nonvolatile memory. As such, the memory 52 stores information about other parties with whom videoconferences will be held, and image information Mind representing an indicator image indicating that the image pickup activity is currently stopped.

The external memory interface 53 is designed to connect a recording medium such as a memory card (not shown) with the interactive communication apparatus 10. A specific party's information and still images may be stored beforehand in the recording medium which is attached to the external memory interface 53 as needed. Attaching the recording medium to the external memory interface 53 makes it possible to hold a videoconference privately with a particular party whose information is not stored in the memory 52. It is also possible to send private still images from the attached recording medium to the desired party. Furthermore, new programs may be placed beforehand in the recording medium. Attaching such a program-loaded recording medium to the external memory interface 53 provides functional updates or expansions for the interactive communication apparatus 10.

The control unit 50 generates the control signal CT using the operation signal PS generated by the operation input section 51, other parties' information stored in the memory 52, and other information held in the recording medium attached to the external memory interface 53. The control unit 50 controls the configured sections of the apparatus by use of the control signal CT thus generated so as to hold a videoconference with a desired parity.

Given the pickup detection signal PD indicating the interruption of image pickup, the control unit 50 reads from the memory 52 the image information Mind representing an indicator image indicating the intentional interruption of image pickup, converts the retrieved information Mind into a video signal DVind of a desired format, and supplies the converted signal DVind to the video switching section 22 as well as to the scaler/OSD section 241. When the image pickup activity is found stopped, the control unit 50 replaces the video signal DVcam from the A/D converter 21 with the indicator image video signal DVind that is fed to the video codec 23, by suitably controlling the operation of the video switching section 22. The control unit 50 may further control the operation of the display driving section 242 based on the operation signal PS in such a manner as to have the screen of the display 12 show the other party's image and the indicator image being sent.

The control unit 50 makes use of other parties' information that is held in the memory 52 or stored in the recording medium attached to the external memory interface 53, as well as still images retained in the image memory 26. The control unit 50 provides a graphic user interface by displaying a graphic user interface screen on the display 12. More specifically, the GUI screen is displayed by suitably controlling the performance of the scaler/OSD section 241 and display driving section 242 in the display processing section 24, with the operations of and settings on the interactive communication apparatus 10 switched and established in keeping with the operation signal PS coming from the operation input section 51.

How the interactive communication apparatus 10 works will now be described. FIGS. 3A, 3B, 3C and 3D are schematic views of image displays appearing on two interactive communication apparatuses communicating with each other interactively.

Figure 3A:
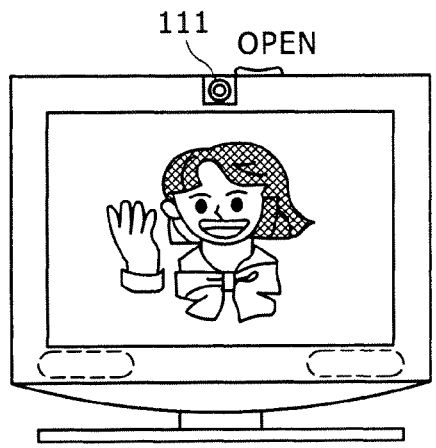
FIGS. 3A, 3B, 3C and 3D are schematic views of image displays appearing on the interactive communication apparatuses.

When the user at an interactive communication apparatus 10-1 wants to send his or her image, the user sets the shutter of the pickup start and stop section 16 to the OPEN position as shown in FIG. 3A, i.e., the position where a pickup lens 111 is left exposed. Given the pickup detection signal PD indicating the continued activation of image pickup, the control unit 50 of the interactive communication apparatus 10-1 causes the video switching section 22 to select the video signal DVcam for use as the video signal DVt that is output to the video codec 23. This allows the image picked up by the image pickup device 11 to be sent to the interactive communication apparatus 10-2 over the network.

Figure 3B:
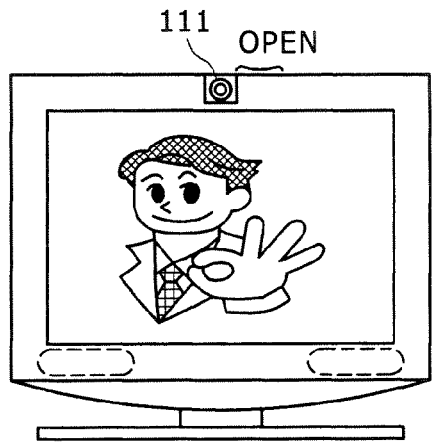

On receiving the signal from the interactive communication apparatus 10-1, the interactive communication apparatus 10-2 gets the video codec 23 to acquire the video signal DVr and has the acquired signal DVr supplied to the display processing section 24. This causes the display 12 of the interactive communication apparatus 10-2 to display the picked-up image from the image pickup device 11 of the interactive communication apparatus 10-1 as shown in FIG. 3B.

Likewise, the picked-up image from the image pickup device 11 of the interactive communication apparatus 10-2 is sent to the interactive communication apparatus 10-1 over the network. The supplied image is displayed on the screen of the display 12 of the interactive communication apparatus 10-1 as depicted in FIG. 3A.

Figure 3C:
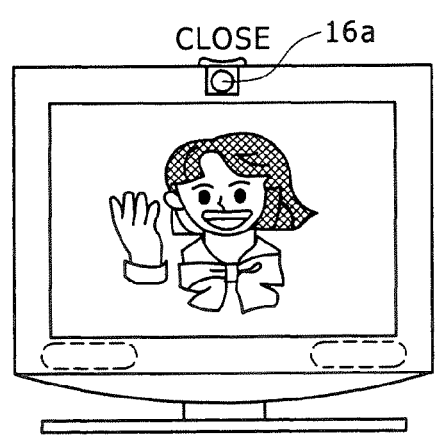

If the user at the interactive communication apparatus 10-1 wants to stop sending his or her image, the user sets a shutter 16a of the pickup start and stop section 16 to the CLOSE position as shown in FIG. 3C, i.e., the position where the pickup lens is covered. On detecting the pickup detection signal PD indicating the intentional interruption of image pickup, the control unit 50 of the interactive communication apparatus 10-1 reads from the memory 52 the image information Mind presenting the indicator image, converts the retrieved information Mind into the video signal DVind of a desired format, and supplies the converted signal DVind to the video switching section 22. By suitably controlling the video switching section 22, the control unit 50 further supplies the video signal DVind as the video signal DVt to the video codec 23. This allows the indicator image to be sent to the interactive communication apparatus 10-2 over the network.

Figure 3D:
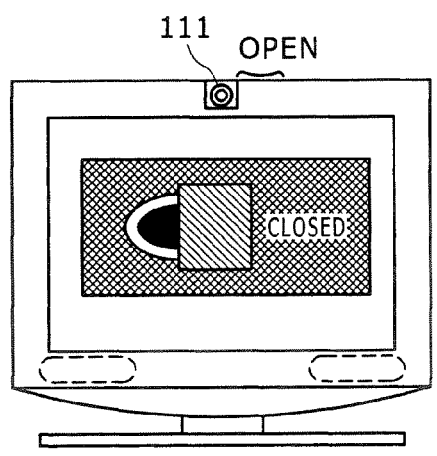

Upon receipt of the signal from the interactive communication apparatus 10-1, the interactive communication apparatus 10-2 gets the video codec 23 to acquire the video signal DVr and feeds the acquired signal DVr to the display processing section 24. This, as shown in FIG. 3D, causes the screen of the display 12 of the interactive communication apparatus 10-2 to display the indicator image indicating that the image pickup activity is being stopped on the interactive communication apparatus 10-1.

As described above, the interactive communication apparatus 10-2 sends the image picked up by the image pickup device 11 to the interactive communication apparatus 10-1 over the network. As a result, the display 12 of the interactive communication apparatus 10-1 displays the picked-up image from the image pickup device 11 of the interactive communication apparatus 10-2 as illustrated in FIG. 3C.

When the screen on the interactive communication apparatus of one communicating party displays the indicator image indicating the interruption of image pickup, that party readily understands why the other party's image is not appearing on the screen. This keeps the communicating party from proceeding to check wastefully whether the network or the interactive communication apparatus has failed.

Each of the image displays in FIGS. 3A through 3D shows only the other party's image. Alternatively, each apparatus may be arranged to display this party's image being sent to the other party along with the other party's image. Such a display arrangement will permit easy verification of the operating status of each party's interactive communication apparatus.

FIGS. 4A, 4B, 4C and 4D are schematic views of other image displays appearing on the interactive communication apparatuses, each display showing both this party's image being sent to the other party and the other party's image.

Figure 4A:
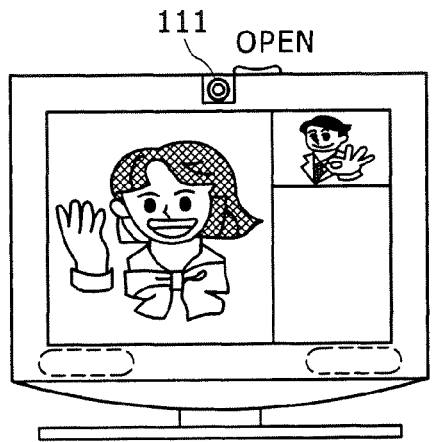
FIGS. 4A, 4B, 4C and 4D are schematic views of other image displays appearing on the interactive communication apparatuses.
Figure 4B:
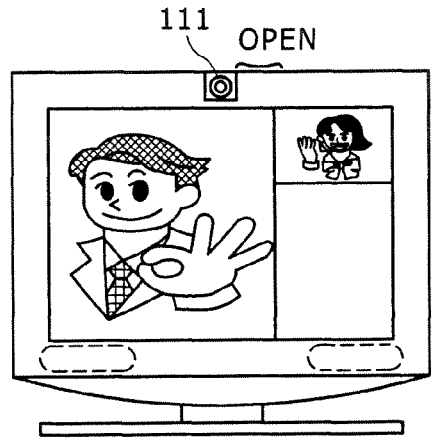

The image picked up by the image pickup device 11 of the interactive communication apparatus 10-1 is sent to the interactive communication apparatus 10-2 over the network. The display processing section 24 of the interactive communication apparatus 10-2 generates the driving signal DR by use of the received video signal DVr and the video signal DVcam generated by the image pickup device 11 of this apparatus 10-2. The display processing section 24 then causes a single screen to display both the picked-up image from the image pickup device 11 of the interactive communication apparatus 10-1 and the picked-up image from the image pickup device 11 of the interactive communication apparatus 10-2, as shown in FIG. 4B.

The image picked up by the image pickup device 11 of the interactive communication apparatus 10-2 is sent to the interactive communication apparatus 10-1 over the network. The display processing section 24 of the interactive communication apparatus 10-1 generates the driving signal DR by use of the received video signal DVr and the video signal DVcam generated by the image pickup device 11 of this apparatus 10-1. The display processing section 24 then causes a single screen to display both the picked-up image from the image pickup device 11 of the interactive communication apparatus 10-1 and the picked-up image from the image pickup device 11 of the interactive communication apparatus 10-2, as shown in FIG. 4A.

Figure 4C:
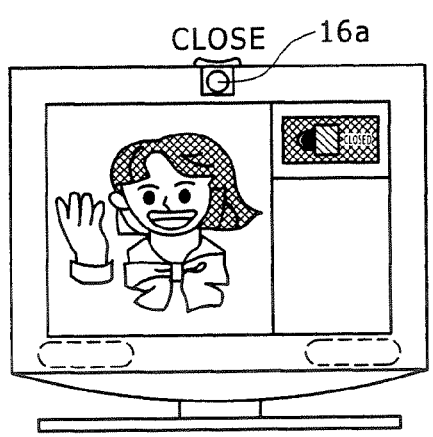
Figure 4D:
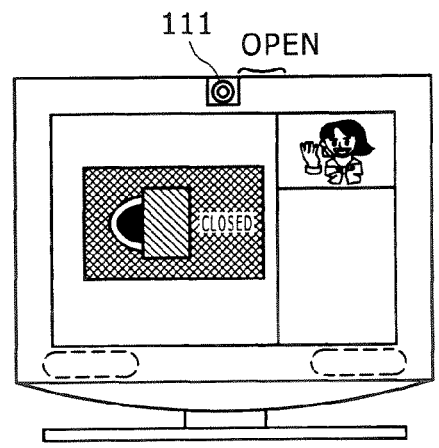

If the user at the interactive communication apparatus 10-1 wants to suppress transmission of his or her image, the user sets a shutter 16a of the pickup start and stop section 16 to the CLOSE position shown in FIG. 4C, i.e., the position where the pickup lens is covered. When the image pickup activity is stopped by the pickup start and stop section 16 in this manner, the video signal DVind representing the indicator image indicating the interruption of image pickup is sent to the interactive communication apparatus 10-2. The display processing section 24 of the interactive communication apparatus 10-2 generates the driving signal DR by use of the received video signal DVr and the video signal DVcam generated by the image pickup device 11 of this apparatus 10-2. The display processing section 24 then causes a single screen to display both the picked-up image from the image pickup device 11 of the interactive communication apparatus 10-2 and the indicator image indicating that the image from the interactive communication apparatus 10-1 is being suppressed.

The display processing section 24 of the interactive communication apparatus 10-1 generates the driving signal DR by use of the received video signal DVr and the indicator image video signal DVind being sent out. The display processing section 24 then causes a single screen to display both the picked-up image from the image pickup device 11 of the interactive communication apparatus 10-2 and the indicator image indicating that image pickup of this interactive communication apparatus 10-1 is being interrupted.

As described above, the image based on the video signal being sent out may also be displayed on the display screen of each interactive communication apparatus. This allows the user of each interactive communication apparatus (10-1, etc.) to ascertain easily that the image pickup activity of the apparatus is being stopped and that the pickup suppressed status of this apparatus is being signaled to the other party.

In the above-described embodiment, the pickup detection signal PD was shown supplied to the control unit 50 so that the control unit 50 may effect output image switchover. This type of interactive communication apparatus may utilize a general-purpose video camera in its image pickup apparatus 11.

However, if the control unit 50 alone is charged with switching the images to be output, the control unit 50 may have to take over diverse controls including image size conversion and format conversion. All this can result in an inordinately heavy workload on the control unit 50.

Figure 5:
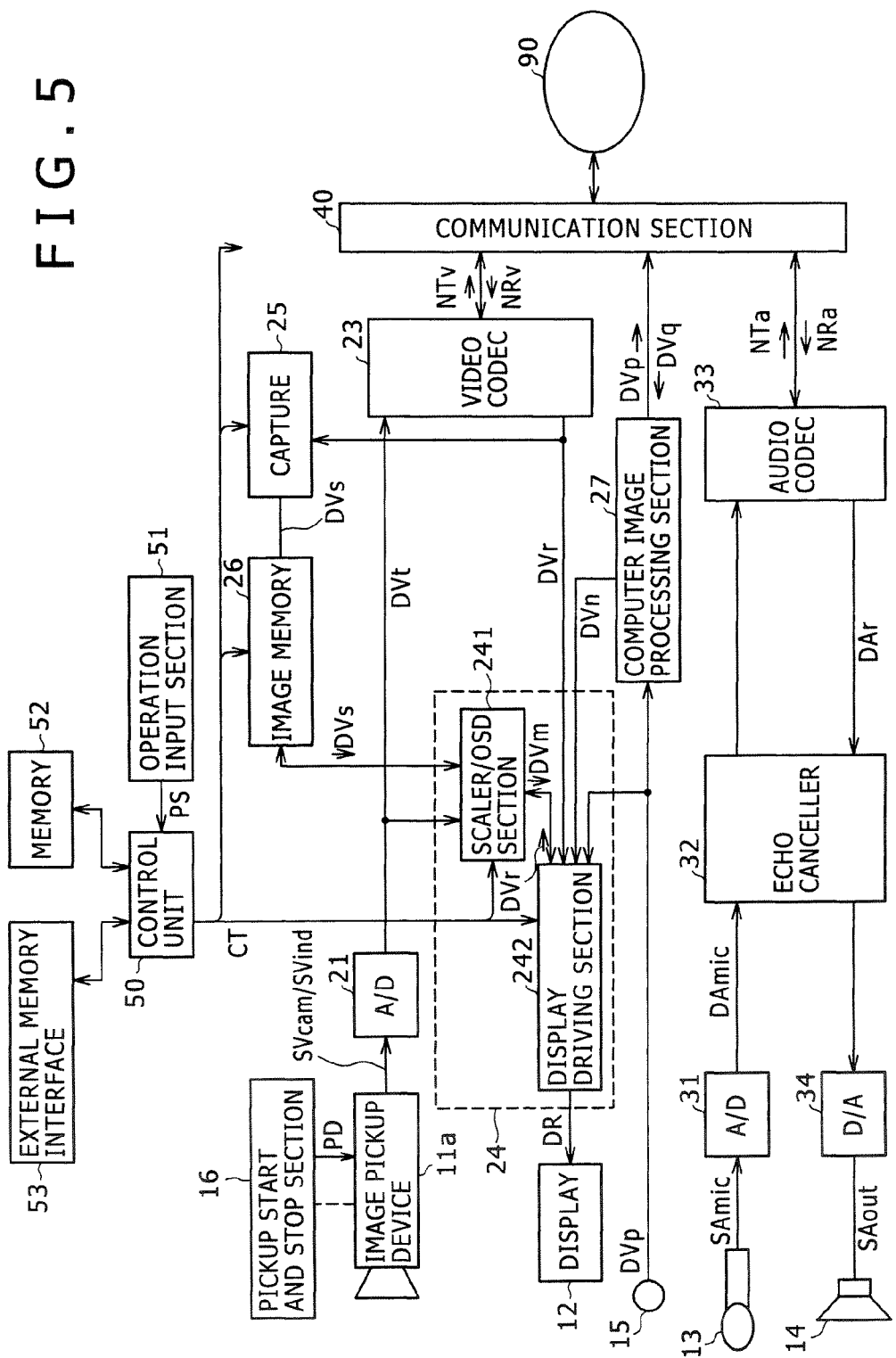
FIG. 5 is a block diagram showing a structure of another interactive communication apparatus.

FIG. 5 is a block diagram showing a structure of another interactive communication apparatus capable of signaling the interruption of image pickup to the other party without overloading the control unit 50 and without making the apparatus structure more complex than it is. In FIG. 5, the component parts with their functionally equivalent counterparts shown in FIG. 2 are designated by like reference numerals, and their descriptions are omitted where redundant.

An image pickup device 11a is configured to replace the picked-up image video signal with a video signal which, when output, represents an indicator image indicating the interruption of image pickup.

FIG. 6 is a block diagram showing an overall structure of the image pickup device 11a. The light entering the pickup lens 111 is focused on the imaging area of an image sensor 112. The image sensor 112 generates an imaging signal and supplies the generated signal to a video signal processing section 113. The video signal processing section 113 suitably processes the imaging signal to acquire a video signal SVcam and forwards the acquired signal SVcam to a video switching section 115.

An indicator image memory 114 that replaces the memory 52 stores the image information Mind representing the indicator image. In accordance with a control signal CR from a control unit 116, to be described later, the indicator image memory 114 retrieves the image information Mind from inside and supplies the retrieved information Mind to the video switching section 115.

The video switching section 115 selectively outputs either the video signal SVcam coming from the video signal processing section 113 or a video signal SVind derived from the image information Mind retrieved from the indicator image memory 114.

The control unit 116 on the imaging side controls generation of the imaging signal by the image sensor 112 as well as signal processing activity of the video signal processing section 113 in accordance with the control signal CR. Given the pickup detection signal PD from the pickup start and stop section 16, the control unit 116 accordingly generates a control signal CR such as to control signal retrieval from the indicator image memory 114 and video signal switchover of the video switching section 115.

As described, the image pickup device 11a selectively outputs either the picked-up image video signal SVcam or the video signal SVind based on the pickup detection signal PD coming from the pickup start and stop section 16, the video signal SVind representing the indicator image indicating that the image pickup activity is being stopped. This setup eliminates the need for the arrangements of the interactive communication apparatus 10 for selectively outputting the video signal DVind. In other words, even where common interactive communication apparatuses with no ability to output selectively the video signal DVind are used, attaching the image pickup device 11a to each apparatus makes it possible for each communicating party to signal the interruption of image pickup to the other party by use of the indicator image. There is no need to store into the memory 52 the image information Mind representing the indicator image indicating the intentional image pickup interruption. The control unit 50 is thus relieved of part of its workload because it need not read the image information Mind from the memory 52 and convert the retrieved information into a necessary format.

In the above-described embodiments, the shutter on the image pickup device is used to constitute the pickup start and stop section. That means the user on either side of communication can determine visually whether or not image pickup is in effect on his or her interactive communication apparatus, by simply taking a look at the appearance of the apparatus.

However, the use of the shutter over the pickup lens of the image pickup device in constituting the pickup start and stop section 16 is only an example and not limitative of the present invention. Alternatively, the operation input section 51 may be utilized as the pickup start and stop section 16. That is, when an operation signal indicating the interruption of image pickup is supplied by the operation input section 51, the video switching section 22 may act on the signal and output the video signal SVind representing the indicator image indicating that the image pickup activity is being stopped. If the video switching section is incorporated in the image pickup device 10a, the control unit 50 may cause the image pickup device 11a to output the video signal SVind representing the indicator image indicating the interruption of image pickup.

Where the shutter covering the pickup lens is not installed in an interactive communication apparatus, it may be impossible for the user of the apparatus to determine whether image pickup is active or not on this apparatus by looking at its appearance. In such a case, the screen of the interactive communication apparatus may be arranged to display not only the other party's image but also the image being sent from this apparatus to the other party, as shown in FIGS. 4A through 4D. Whenever the image pickup activity is intentionally stopped on a given interactive communication apparatus, the screen of the apparatus may then display the indicator image signaling the interruption of image pickup to the user of the apparatus for verification. If the shutter mechanism is not used, all related parts will become unnecessary, which can translate into an appreciable reduction in the cost of the interactive communication apparatus.

It should be understood by those skilled in the art that various modifications, combinations, sub-combinations and alterations may occur depending on design requirements and other factor in so far as they are within the scope of the appended claims or the equivalents thereof.

What is claimed is:

1. An interactive communication apparatus for sending a video signal obtained by an image pickup device performing an image pickup activity to another apparatus through a communication section while controlling a display section to display an image based on a video signal received from said another apparatus through said communication section, said interactive communication apparatus comprising:

a pickup start and stop section configured to stop said image pickup activity of the image pickup device, the image pickup activity capturing an optical image and converting the optical image to generate the video signal obtained by the image pickup device, the pickup start and stop section including a switch configured to cover a lens of the image pickup device, the switch transmitting a signal indicating that the image pickup activity is stopped when the switch covers the lens;

an indicator image storage section configured to store image information constituting an indicator image indicating that said image pickup activity is stopped;

a video switching section configured to selectively switch between the video signal obtained by said image pickup device performing said image pickup activity, and a video signal based on said image information stored in said indicator image storage section, said video switching section being further configured to supply said communication section with the selected video signal; and a control unit configured to control said video switching section to supply said communication section with the video signal based on said image information stored in said indicator image storage section when the control unit receives the signal indicating that the image pickup activity is stopped.

2. The interactive communication apparatus according to claim 1, wherein
said indicator image storage section, said video switching section and said control unit are incorporated in said image pickup device, and
said image pickup device is configured to output said video signal based on said image information constituting said indicator image when said image pickup activity is stopped by said pickup start and stop section.

3. The interactive communication apparatus according to claim 1, further comprising:
a display processing section configured to control said display section to display an image based on the video signal received from said another apparatus along with an image output by said video switching section.

4. A status signaling method for use with an interactive communication apparatus which sends a video signal obtained by an image pickup device performing an image pickup activity to another apparatus through a communication section while controlling a display section to display an image based on a video signal received from said another apparatus through said communication section, said status signaling method causing a control unit for controlling transmission of the video signals to carry out a procedure comprising the steps of:

determining whether said image pickup activity of the image pickup device is stopped based on a switch configured to cover a lens of the image pickup device, the image pickup activity capturing an optical image and converting the optical image to generate the video signal obtained by the image pickup device, the determining determines that the image pickup activity is stopped when the switch covers the lens;

transmitting a signal indicating that the image pickup activity is stopped when the determining determines that the image pickup activity is stopped; and sending a video signal based on image information constituting an indicator image indicating that said image pickup activity is stopped, in place of said video signal obtained by said image pickup device performing said image pickup activity, after receiving the signal indicating that the image pickup activity is stopped.

5. The status signaling method according to claim 4, further comprising:

outputting said video signal based on said image information constituting said indicator image when said image pickup activity is determined to be stopped.

6. The status signaling method according to claim 4, further comprising:

controlling a display section to display an image based on the video signal received from said another apparatus along with an image currently being output.

7. The interactive communication apparatus according to claim 1, wherein the switch includes a shutter and a shutter switch, the shutter switch being configured to operate with the shutter, and the shutter switch transmits the signal indicating that the image pickup activity is stopped when the shutter covers the lens.

8. The status signaling method according to claim 4, wherein the switch includes a shutter and a shutter switch, the shutter switch being configured to operate with the shutter, and the determining determines that the image pickup activity is stopped when the shutter covers the lens.

* * * * *